April 11, 1961     M. W. BRADLEY     2,978,934
WIRE STRIPPING DEVICE
Filed June 15, 1959
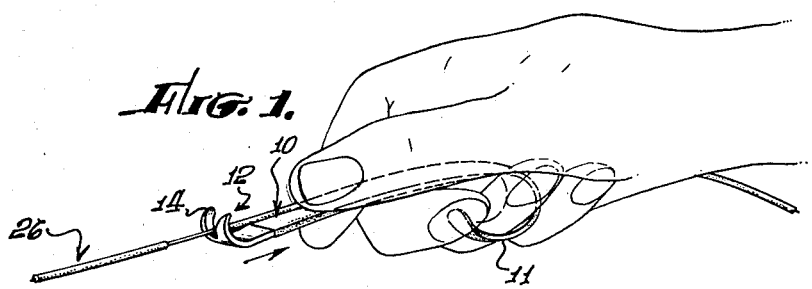
Fig. 1.
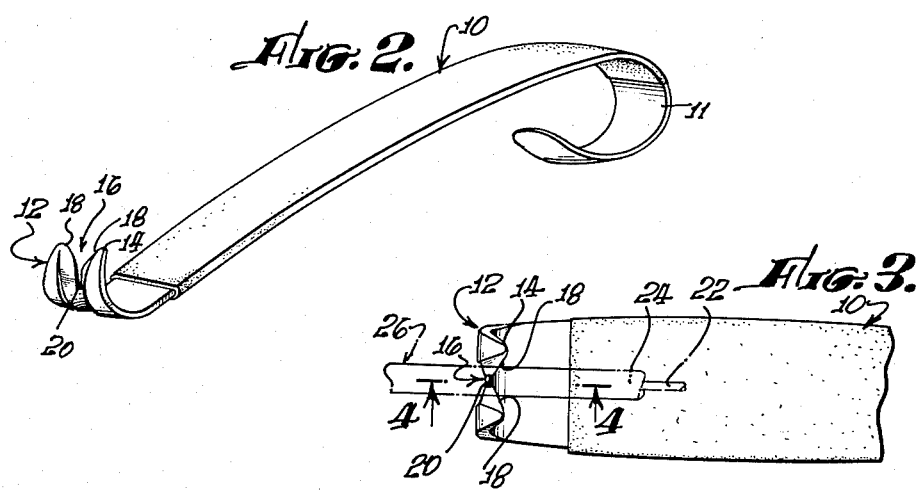
Fig. 2.
Fig. 3.
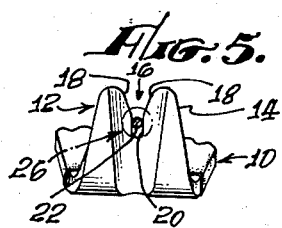
Fig. 5.
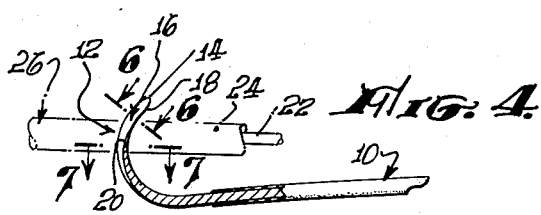
Fig. 4.
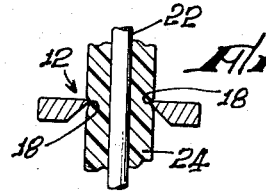
Fig. 6.
Fig. 8.
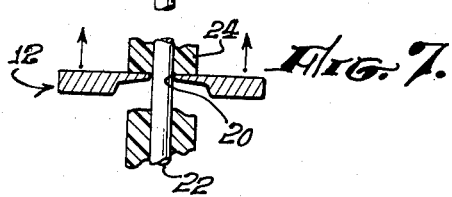
Fig. 7.
INVENTOR.
BY William C. Babcock
ATTORNEY.

United States Patent Office 2,978,934
Patented Apr. 11, 1961

2,978,934

WIRE STRIPPING DEVICE

Marion W. Bradley, Norwalk, Calif.
(14206 E. Coolbank Drive, La Mirada, Calif.)

Filed June 15, 1959, Ser. No. 820,279

1 Claim. (Cl. 81—9.5)

This invention relates to wire strippers and more particularly to an improved wire stripper for removing insulation from single or multiple strand electrical conducting wires.

Many devices are known and are commercially available for removing the insulation from insulated electrical conducting wires. However, such wire stripping devices are often difficult to use by the operator and most of such devices are injurious to the conductor from which the insulation is being stripped. That is, in the prior state of the art many of the wire stripping devices utilize a shearing or cutting member which cuts the insulation surrounding the wire by means of a scissors-type or shearing-type of action. The common difficulty with such wire stripping devices is that the cutting action does not terminate at the outside diameter of the conductor but does, conversely, continue until the conductor itself stops the cutting action. Such operation results in a nicking or cutting of the conductor, and the cut or nicked point becomes a source of future failure or fracture. That is, the most common type of wire stripping device resembles a pair of pliers with sharpened edges which are compressed down upon the insulation and rotated about the wire to cut through the insulation. If too much pressure is applied or if the operator is not sufficiently skillful at terminating the depth of the cut, the conductor is scratched, nicked or at times cut completely through. Where such nicks occur the conductor is weakened and often fails at a later date through mechanical failure. In the case of multiple strand electrical conductors, some of the conductors at the outer periphery are often cut through and result in a point of possible electrical shorting when the wire is in use.

It is an object of the present invention to provide an improved wire stripper which is simple and economical of construction.

It is another object of the present invention to provide an improved device for stripping the insulation from a wire which device is extremely simple in use.

A further object of the present invention is to provide an improved wire stripper which when used by an operator is not capable of cutting, nicking or otherwise harming the conductor from which the insulation is being removed.

Yet another object of the present invention is to provide an improved wire stripper which is free of moving parts and which is extremely fast and efficient in operation.

The present invention is a wire stripper comprising an elongate member having a cutting end and a gripping end. At the cutting end of the elongate member there is formed a cutting member inclined upwardly from and rearwardly toward the elongate member. A cutting groove extends from the upper edge of the cutting member. The cutting groove has downwardly and inwardly sloping cutting edges which terminate in a groove of substantially constant width, which width is substantially equal to but greater than the diameter of the conductor from which the insulation is to be removed.

The novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

In the figures:

Figure 1 is a view in perspective showing the stripping apparatus of the present invention being used to strip the insulation from a single strand electrical conductor;

Figure 2 is a view in perspective of the presently preferred embodiment of the present invention;

Figure 3 is a plan view of the cutter end of the device of Figure 2;

Figure 4 is a view in elevation corresponding to Figure 3 as taken along line 4—4 of Figure 3;

Figure 5 is an end view corresponding to Figure 3;

Figure 6 is a partial view in section taken along line 6—6 of Figure 4;

Figure 7 is a view in section taken along line 7—7 of Figure 4; and

Figure 8 is a bottom plan view of the wire stripper shown in Figure 2.

Referring now to the drawings and particularly to Figures 2 through 5, there is shown a presently preferred embodiment of the present invention. The device comprises in general an elongate body portion 10 having a gripping area 11 at one end thereof and a cutter member 12 at the cutting end thereof. The elongate body portion 10 is an elongate strip of sheet steel the ends of which are bent to form the gripping end 11 and cutting end 12. In the embodiment shown the strip at the gripping end is curved inward upon itself and twisted laterally through a small angle in a plane normal to that of the strip along a substantially large radius through more than 270 degrees such that a gripping member adapted to be fitted, for comfortable and secure support, in alignment with and about a finger of the user is provided at 11. This is clearly shown in Figure 8. Many forms of gripping configurations or construction may of course be used.

The cutting member 12 is formed by bending the end of the elongate member 10 upward at the cutting end thereof. The cutting member is bent in this embodiment along a radius through more than 90 degrees such that the upper end 14 of the cutter member extends upwardly and rearwardly toward the body portion 10 of the device. A cutting groove 16 is formed in the cutter member 12 extending from the upper end 14 of the cutter member downward substantially along the longitudinal axis of the device. The cutting groove 16 is such that it forms inwardly and downwardly tapered side walls 18 which terminate in a downwardly extending slot 20 of substantially constant width. The width and depth of the slot 20, noting Figs. 2, 3 and 5, are substantially equal to but slightly greater than the diameter of the conductor 22 from which the insulation 24 is to be stripped. The tapered walls 18 of the cutting groove 16 are tapered such that the width of the groove at the upper end thereof is substantially greater in width than the diameter of the insulation 24 upon the conductor 22. The cutter member 12 is decreased in thickness or beveled around the cutting groove 16 to define a cutting edge on the tapered walls 18. That is, in the embodiment shown a depression is ground into the cutter member surrounding the area of the cutting groove 16 until the metal surrounding the tapered walls 18 of the cutting groove is reduced in thickness to a relatively sharp edge as shown particularly in Figures 4 and 6.

In the present embodiment shown in the figures the cutting edge is obtained by grinding the cutter member as shown in Figures 2 and 4 to provide a depression in the cutter member throughout the area of the member surrounding the groove. For reasons which will become more apparent in the description of the operation of the device it is preferable that the cutting edge be formed only on the sloping walls 18.

Thus, as shown particularly in Figures 2 and 4, the cutting groove 16 is defined by cutting member 12 such that the plane of the groove extends substantially upward from the body portion 10 and rearwardly toward the body portion. When a wire 26 is laid in the groove 16 extending from the groove toward the body portion 10 at any point on the body portion it will be positioned within the groove such that the plane of the groove extends at an angle to the axis of the wire and is inclined toward the end of the wire being stripped. That is, the cutting groove 16 of the device is inclined such that when the device is in use the groove is inclined at an angle to the wire being stripped, the angle of the groove being upward and toward the direction of movement of the device or toward the end of the wire over which the insulation is to be removed.

Thus, in operation, referring to Figures 1 and 3 through 8, the user of the device positions the device conveniently in his hand with either his little finger, or the one next thereto, inserted in the substantially circular curved and laterally twisted portion 11 and lays the wire 26 to be stripped into the cutting slot 16 with the end of the wire over which the insulation is to be removed positioned rearwardly of the cutting slot toward or onto the body portion 10 of the device as shown in Figures 1 and 4. As the device is pulled toward the end of the wire, the angle of the cutting groove 16 with respect to the wire pulls upward and forward upon the insulation and forces the wire downward into the cutting groove 16. The type of wire shown in the drawing is the single strand, plastic insulated wire in common use.

As the wire moves downward into the groove the tapered edges 18 of the groove cut through the insulation 24 until the wire passes into the slot 20 of constant width. Upon passing into the slot 20 the wire portion of the wire is not touched by the sides of the groove. Thus, as shown in Figure 6, as the device is pulled toward the end of the wire, the cutting edge 18 presses into the insulation. As the device is pulled with greater force, the wire 26 moves further downward into the tapered portion of the cutting groove 16, and the cutting edge 18 cuts through the insulation 24 and toward the conductor 22.

When the insulation is pierced the conductor 22, as shown in Figure 7, has moved into the slot 20 which is slightly greater than the diameter of the conductor 22 and preferably does not have a sharp edge. Upon a continued pull of the device the upper and lower portions of the insulation which have not been cut are ruptured and the insulation is securely held by the device and moved outward over the end of the conductor 22, thus stripping the insulation from the conductor.

The gripping area 11 can take any desired configuration. In the present embodiment the grip is adapted for a right-handed user by twisting the elongate member to obtain a gripping member, as shown in Figure 8, which engages the fingers when the tool is properly positioned with respect to the wire. The twist can of course be reversed and particularly adapted for a left-handed user. With the gripping end portion 11 shaped as disclosed, the stripper device will remain supported on the finger of the user, if desired, even though the thumb and forefinger are temporarily released therefrom for performing other operations until it is slid off of the end of the finger, since its arcuate extent is too great to permit the finger to be removed sideways therefrom.

Thus, the present invention provides an improved device for removing the insulation from electrical conducting wires quickly and efficiently without damage to the conductor.

What is claimed is:

A wire stripper device for removing the insulation from the conductor in insulated wire comprising: an elongate body member, a cutter member portion formed at one end of said body member, said cutter member portion being formed by extending said elongate member upwardly and rearwardly at a radius of curvature through an arc of more than ninety degrees with respect to said elongate body member, a cutting groove defined by said cutter member extending downwardly from the upper end of said cutter member substantially along the longitudinal axis of said device, said cutting groove having downwardly convergent side walls, said side walls being beveled to form opposed cutting edges, the upper end of said side walls being at a width greater than the diameter of said insulation, a slot of substantially constant width extending downwardly from and coextensive with said convergent side walls, both the width and length of said slot each being substantially equal to but greater than the diameter of the conductor, the opposite end of said elongate body extending in a direction opposite to that of said cutter end portion, downwardly and forwardly at a radius of curvature through an arc of more than two hundred seventy degrees with respect to said elongate body portion to form a finger gripping portion, said finger gripping portion being twisted laterally through an angle in a plane normal to that of the elongate body portion such that when supported around a finger of and gripped in the hand of the user the said finger gripping portion will lie in alignment with and concentrically of the finger.

References Cited in the file of this patent

UNITED STATES PATENTS

| | | |
|---|---|---|
| 1,260,642 | Chia | Mar. 26, 1918 |
| 1,625,003 | Walker | Apr. 19, 1927 |
| 2,189,752 | Breitschwerdt | Feb. 13, 1940 |
| 2,273,048 | Kiefer | Feb. 17, 1942 |
| 2,361,402 | Jamieson | Oct. 31, 1944 |
| 2,620,692 | Marshall | Dec. 9, 1952 |